United States Patent [19]
Okada et al.

[11] Patent Number: 5,509,600
[45] Date of Patent: Apr. 23, 1996

[54] HOT PRESSURE WELDING OF HOT STEEL STOCK

[75] Inventors: Seiji Okada, Tounoshou; Yutaka Suzuki, Sakura; Kouichi Sakamoto, Kamisu; Hitoshi Teshigahara, Kusatsu; Takao Taka, Ikoma; Yasuto Fukada, Nishinomiya; Masami Oki, Narashino, all of Japan

[73] Assignee: Sumitomo Metal Industries, Ltd., Osaka, Japan

[21] Appl. No.: 250,671

[22] Filed: May 27, 1994

[30] Foreign Application Priority Data

May 27, 1993 [JP] Japan ................. 5-125613

[51] Int. Cl.$^6$ .................................................. B23K 20/14
[52] U.S. Cl. .................................. 228/205; 228/220
[58] Field of Search .................. 228/5.7, 158, 205; 29/81.05, 81.12; 409/139

[56] References Cited

U.S. PATENT DOCUMENTS

| | | | |
|---|---|---|---|
| 2,782,498 | 2/1957 | Mushovic et al. | 228/205 |
| 3,250,179 | 5/1966 | Cavagnero | 228/205 |
| 3,791,258 | 2/1974 | Krall et al. | 409/139 |
| 4,662,044 | 5/1987 | Kayabara | 29/81.05 |
| 5,222,654 | 6/1993 | Oki et al. | 228/205 |

FOREIGN PATENT DOCUMENTS

| | | |
|---|---|---|
| 0296839A3 | 12/1988 | European Pat. Off. . |
| 0479681A2 | 4/1992 | European Pat. Off. . |
| 60-244406 | 12/1985 | Japan . |
| 61-1489 | 1/1986 | Japan . |
| 61-108408 | 5/1986 | Japan . |
| 61-126907 | 6/1986 | Japan . |
| 61-126983 | 6/1986 | Japan . |
| 4-138883 | 5/1992 | Japan . |
| 5-8058 | 1/1993 | Japan . |
| 5-15902 | 1/1993 | Japan . |
| 5-50111 | 3/1993 | Japan . |

Primary Examiner—Kenneth J. Ramsey
Attorney, Agent, or Firm—Burns, Doane, Swecker & Mathis

[57] ABSTRACT

A method of hot pressure welding of hot steel stock, in which the ends of the steel stock are descaled mechanically and pressure joined under a reducing flame. Since re-oxidation after descaling is prevented and the feasible temperature for hot pressure joining is maintained by the reducing flame, the joining is accomplished firmly and strong joints are obtained.

26 Claims, 5 Drawing Sheets

HOT PRESSURE WELDING OF HOT STEEL STOCK

FIELD OF THE INVENTION

The present invention relates to hot pressure welding of steel stock, and more particularly to a method of efficiently and firmly joining steel stock under hot conditions, e.g., steel stock during continuous hot rolling (hereunder called "hot steel stock") resulting in a joint of high quality.

BACKGROUND OF THE INVENTION

Many attempts have been made in steel plants to achieve a continuous production line throughout the various stages of steel production, not only for the purpose of increasing product yields and production efficiency but also for the purpose of saving energy. Of these, the most significant is an attempt to create a continuous hot rolling line in which hot rolled steel strip (hot coil) is produced.

Heated slabs are reduced one by one intermittently by passing through a rough rolling mill and a finish rolling mill according to the prior method of hot rolling.

An intermittent rolling method like this easily gives rise to distortion of the leading end of the steel stock particularly when it is thin and stacked up upon the guide rolls, or is wrinkled at the rear end of the steel stock and damages the roll as it leaves the mill.

The rolling line will have to be stalled for maintenance and/or repair or exchange of rolls, if problems of this kind occur.

One way of avoiding the above mentioned difficulty is to slow down the rolling speed at the leading end of the hot steel stock. However, this has to be carried out at the sacrifice of the mill efficiency and, in addition, it can easily give rise to discrepancies in product quality and consequent defects as the rolling temperature is taken out of the adequate range for rolling.

Furthermore, a failure to meet the dimensional tolerances is often caused at the leading and rear ends of the steel plate by unstable tension created at the ends. These portions have to be discarded, resulting in an appreciable loss of the product yield.

A number of methods, as mentioned below, have recently been proposed in order to solve these problems.

Basically, the rear end of a preceding rough rolled steel plate (hereafter referred to as the preceding plate) and the front end of the succeeding rough rolled plate (hereafter referred to as the succeeding plate) are joined together to provide a continuous supply of steel stock to the finishing mill.

Japanese Patent Kokai No. 61-1489 discloses the most basic procedures for lap welding the ends of descaled steel sheets (sheet bar). Japanese Patent Kokai 61-126938 and Kokai 61-126907 also propose a method for pressure welding after descaling with the aid of hot scurfers. Sufficient joint strength is secured by neither of these methods, because oxidation takes place again immediately after descaling, forming oxide scale on the joining surfaces due to the high temperature of the steel plates themselves before pressure welding is completed.

The technology disclosed by Japanese Patent Kokai No. 60-244406 shows a method of preventing re-oxidization of the surfaces to be joined after descaling, by blowing them with inert gas (such as nitrogen or argon). Even this method cannot always be perfect, as surface re-oxidation due to air binding from the surrounding atmosphere is inevitable, and together with decreasing the temperature of the surfaces to be joined by gas blow may prevent sufficient development of the joint strength.

The inventors of this invention discovered that a separate step of mechanical descaling prior to the out joining of hot steel stocks is not necessary if the joining process is carried out in a specific reducing atmosphere. The invention based on the above findings has been disclosed in Japanese Patent Kokai 5-8058 (U.S. Pat. No. 5,222,652).

The method according to the invention of Japanese Patent Kokai 5-8058 (U.S. Pat. No. 5,222,652) is characterized by pressure welding of the hot steel stock after heating the joining portion of the stock in a reducing atmosphere and after the oxide scale is reduced.

However, there is a limiting thickness of the scale which can be reduced simply by heating in a reducing atmosphere, and the reduction of a scale heavier than 10 μm or a scale of the composition that is not easily reduced will be take long time.

Joining of the hot steel stock in the hot rolling line should be carried out in as short a time as possible. Since the hot steel stock after hot pressure joining is exposed to tensile stress in the continuous finish rolling, the joint ought to have an elevated temperature tensile strength to withstand this tension.

In some cases, however, the joint may fall short of the required strength with a simple reduction of the scale in a reducing atmosphere.

OBJECT OF THE INVENTION

A primary object of this invention is to provide a method of soundly joining steel stocks at high temperature, with sufficient strength at an elevated temperature, after descaling the surfaces to be joined and preventing them from re-oxidization before the hot pressure welding is completed.

It is common practice to mechanically remove the surface oxide and pressure join them in order to accomplish a rapid and secure joint between hot steel stock (sheet bars) prior to the finishing roll in a hot rolling line. The steel stock, however, is at a high temperature of about 1150°–900° C. before the finishing mill and after the rough rolling mill. Therefore, oxide scale will develop again on the surfaces to be jointed, even if descaling is carried out in the meantime. A measure has to be taken to prevent re-oxidization after descaling and before the pressure joining in order to make it effective.

SUMMARY OF THE INVENTION

The present invention provides a method of joining hot steel stock as described below.

According to this invention, the portions of hot steel stock to be joined are mechanically descaled in a reducing atmosphere and are pressed together to form a joint. The reducing atmosphere is obtained by combustion flame in accordance with the formula (1) below:

$$P \geq 286\, m - 172 \qquad (b\ 1)$$

wherein, P is an oxygen enrichment ratio of oxygen in the combustion air (% by volume), and m is an oxygen ratio of oxygen combusted relative to an amount of oxygen required for complete combustion of the fuel.

It is desirable that the reducing flame applied in this invention is obtained under the combustion conditions satisfying (2) or (3), or both:

$$P \geq -113\ m + 90 \quad (2)$$

$$P \leq 94\ m + 143 \quad (3)$$

For the purpose of mechanically descaling the steel stock in accordance with this invention, as is commonly practiced with descaling of conventional steel material, a wire brush, a grinder, or a needle descaler (commercially known as a jet chisel), and the like may be used. A plane tool can also be used.

The descaling in the method of this invention is done at high temperature, while exposed to a reducing atmosphere. Therefore, it is desired that some considerations are given to protect the descaling tools.

Examples of applications are a rotary cutting tool with a thermal shield or one with an internal cooling device. Type of rotary cutting tools include one with spiral cutting or straight edges formed in the cylindrical surface of a body made of tool steel or high speed cutting steel, and another with multiple cutting tool bits engraved on a cylindrical body. All of these perform the action of cutting the surface by rotating.

The rotary cutting tool itself has thermal resistance and is capable of practical use as it is. However, it is more desirable to provide it with a thermal shield to avoid the direct burning action of the flame, or else to equip it with an internal cooling device.

Reducing flame means a flame obtained by combustion of combustible gases such as acetylene, liquefied petroleum gas (LPG), liquefied natural gas (LNG), and coke-oven gas (COG), with less oxygen gas than that required to accomplish complete combustion.

The reducing flame contains reducing components such as hydrogen-radicals and $CH_2O$-radicals (hereunder referred to as "reducing radicals"). The larger the content of the reducing radicals, the higher is the level of reducibility of the flame.

DESCRIPTION OF PREFERRED EMBODIMENTS OF THE INVENTION

The effect obtained by this invention is described below with its preferred embodiments.

According to this invention, all the processes, from mechanical descaling through rolling, are carried out at high temperature and specifically under a specific reducing atmosphere. The scale generated in the preceding process steps that consists of iron oxides, and oxides of silicon and manganese exists on the steel stock surface to be joined.

It is common practice, as mentioned before, to have the surfaces to be joined clean and free from these oxides prior to pressure joining them. However, in the case of hot joining, remedies to prevent re-oxidization are required to secure a sound joint after descaling. Further, it is essential to hold the steel stock at a stable high temperature to make the pressure joining effective and be able to finish the subsequent rolling at a specified temperature. Preventing deterioration of tooling also should be taken into account to maintain economical and practical operation.

When a reducing flame is generated under atmospheric conditions, oxygen gas which comes from the surrounding atmosphere reacts with remaining hydrogen and carbon monoxide to form reducing radicals.

When combustion air enriched with oxygen is used, the content of nitrogen gas in the combustion air is decreased compared with the atmospheric air, and the flame temperature is raised. This results in an increased generation of reducing radicals. The rise in temperature compensates for the cooling effect brought about by mixing with the ambient air.

Reducibility of the flame is influenced by the mixing ratio of the fuel and the combustion air, and especially by its oxygen content. Thus, the inventors of this invention conducted the following experiments to determine combustion conditions suitable for preventing the surface of the hot steel stock from re-oxidization after descaling and for heating it to the temperature required for hot pressure joining.

Figure 1:
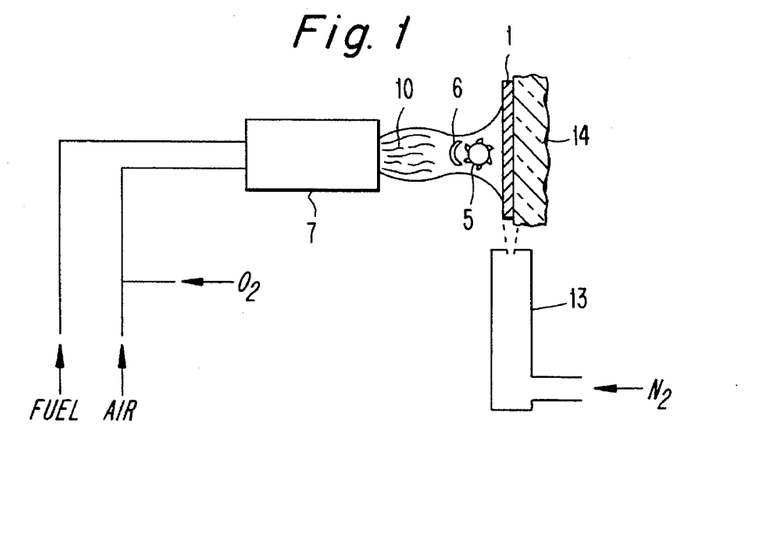
FIG. 1 is a schematic illustration explaining an experiment which was carried out to determine suitable heating conditions when using a reducing flame.

FIG. 1 schematically shows experimental procedures in which a combustion fuel (COG) and air are supplied to a burner (7) and the air is enriched with the addition of oxygen. A steel plate (1) to be heated has 10 μm thick scale. The plate is heated to 1000° C. and covered with thermal insulation (12) on the rear. The thickness of 10 μm for the scale was chosen to simulate the usual scale thickness on hot steel plate to be joined under practical conditions. While the steel plate was heated by the flame from the burner (7), the scale was removed by a rotary cutting tool (5), which will be described later in detail.

Flame blowing only was continued for 30 seconds after mechanical descaling was completed in order to examine the effects of preventing re-oxidization and maintain the high temperature. The degree of re-oxidization of the surface was examined by observing the steel surface after rapidly cooling it with the apparatus (13) for spraying the coolant nitrogen gas.

The relationship between the oxygen enrichment ratio P and the oxygen ratio m that renders favorable conditions to prevent re-oxidization was determined in terms of the oxygen enrichment ratio P (% by volume), the oxygen content in combustion air after addition of oxygen gas to it, and the oxygen ratio m, the ratio of the actual amount of oxygen supplied to the calculated amount of oxygen which is required for complete combustion of fuel. Favorable preventative conditions mean that virtually no scale would develop on the descaled surface while it travels from the descale stage to the finish rolling stage (about 10 seconds).

Figure 2:
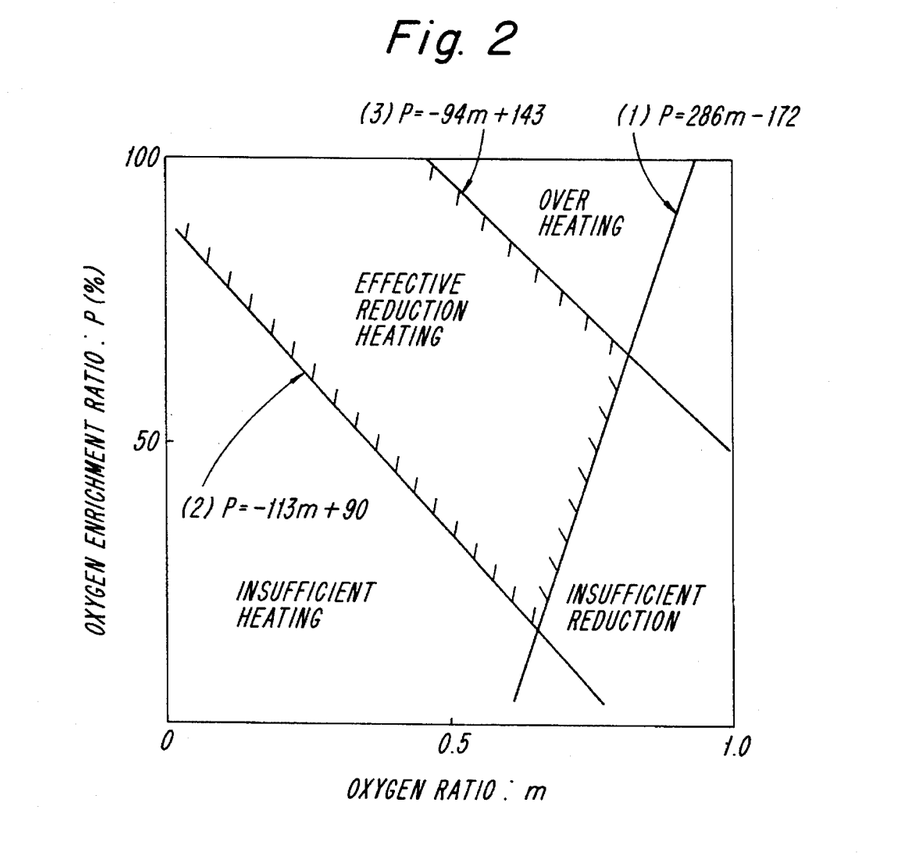
FIG. 2 is a graph showing the favorable range of oxygen ratio and oxygen enrichment ratio.

It has been found from the above tests that in the range above the line (1) in FIG. 2, namely where $$P \geq 286\, m - 172 \qquad (1)$$

is satisfied, re-oxidization can be prevented.

The smaller the oxygen ratio m is and the larger the oxygen enrichment ratio P is, the higher the reducibility of the flame becomes. This is because the the smaller the oxygen ratio m is, the larger is the amount of reducing components, while the larger the enrichment ratio P becomes, the larger becomes the amount of generation of the reducing radicals, hence enhancing the reducibility.

The reducing flame of this invention is effective not only for preventing the hot steel stock from re-oxidizing but also for heating or maintaining it at a suitable temperature for joining. When m becomes small the flame temperature decreases, resulting in a loss of the heating capacity of the flame. On the other hand, when the air is enriched with oxygen (P becomes larger), the flame temperature rises to enhance the capacity of the flame to heat.

In the range above line (2) in FIG. 2, namely, where $$P \geq -113\, m + 90 \qquad (2)$$

is satisfied, the temperature of the steel stock can be kept at about 1000° C. by heating with the flame.

Formula (2) is not required to be satisfied if the steel stock temperature is sufficiently high originally, or the cooling effect on its temperature is not significant during the short lapse of time between the rapid descaling process and the joining process. However, it is desirable to have conditions of combustion that would satisfy formula (2) as well as formula (1) above, because in the range below line (2) the temperature maintaining action is weak, and in addition, the flame tends to be excessively reducing giving out soot that would stick to the surfaces to be joined, which would be detrimental to the joint strength.

The thermal resistance of the descaling tools and of the hot pressure joining tools will have to be discussed when the operation of descaling and pressure joining is carried out under the reducing flame. The tools may melt down if the temperature of the flame is too high, or they may crack due to thermal shock if the rate of heating is too rapid.

The range above line (3) in FIG. 2, for which $$P \leq -92\, m + 143 \qquad (3)$$

is not satisfied, is where the flame temperature becomes excessively high. Since the categories of tools to be applied may be limited or the life of tools may tend to be short if used in the above mentioned range, it is desirable to work in the range where formula (3) is satisfied in order to practice this invention at a reasonable cost.

In summary, it is essential to use a reducing flame that satisfies formula (1) to effect this invention, and in addition it is desirable to choose conditions of combustion satisfying formulas (2) and/or (3).

Figure 3:
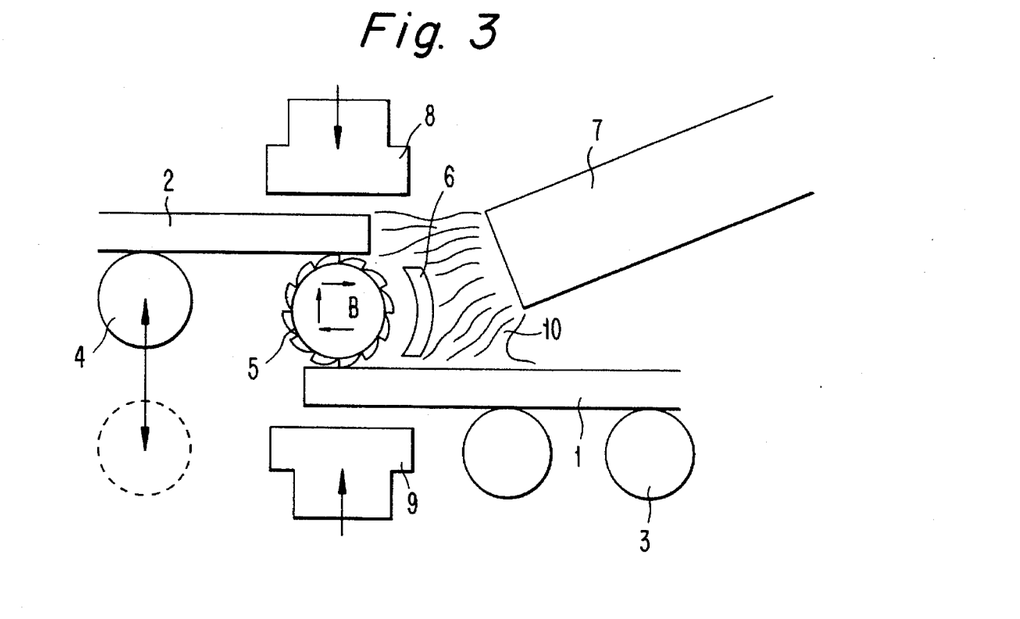
FIG. 3 is a schematic illustration of using a rotary cutting tool for descaling.

FIG. 3 is a schematic illustration of hot pressure joining as described in this invention (between the rough rolling mill and the finish rolling mill in the hot rolling line). The rear end of the preceding plate (1) and the front end of the succeeding plate (2) are to be joined. (3) and (2) are the table rollers to transfer the plate with. (5) is the rotary cutting tool, and (6) is a thermal shield. (7) is the burner that blows the reducing flame (10). (8) and (9) are the upper and the lower anvils of the press, respectively.

The rotary cutting tool is made from tool steel or high speed steel with curved spiral edges. Descaling is carried out very rapidly with a tool such as this rotating at high speed and facing the steel plate surface which it is to be descaled.

An apparatus as illustrated in FIG. 3 is used to execute the method of this invention. First, the preceding plate (1) is stalled when it arrives at the predetermined position.

Next, the succeeding plate (2) is advanced and brought up by table rollers (2) until its front end is overlapped with the rear end of the preceding plate leaving a certain gap, and held still.

The rotary cutting tool (5) and the thermal shield (6) are inserted into the aforementioned gap. In reference to FIG. 3, they will be inserted from the direction perpendicular to this sheet of paper. The cutting tools may be supported at both ends and set at the descaling position prior to positioning of the plate and the burner.

Figure 4A:
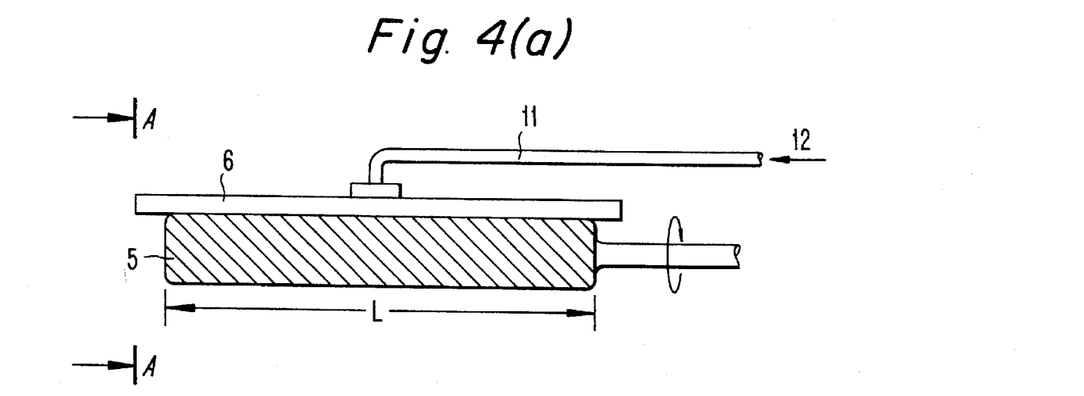
FIG. 4 is a schematic illustration of a rotary cutting tool provided with a thermal shield.
Figure 4B:
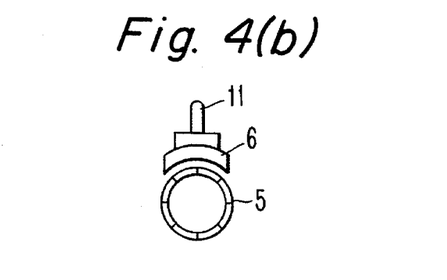

FIG. 4 illustrates a way of shielding with the thermal shield (6). FIG. 4(a) shows a side view and (b) is a projection in the direction of the arrows. The rotary tool (5) is motor-driven. The thermal shield (6) is supported independently and placed between the rotary tool and the reducing heating flame.

An example of a shield with a curved surface is shown in FIG. 4, but it is not limited to this particular shape. The material for the shield should be heat resistant as is, for example, stainless steel.

A gas supply tube (11) should be connected to the shield (6), to enable the flow of protective gas (12) into it. Use of non-oxidizing gas (inert gas or reducing gas) such as nitrogen and hydrogen is desirable to cool the tool and the shield, and to prevent re-oxidization of the descaled surface.

After positioning the rotary tool (5) and the thermal shield (6) as illustrated in FIG. 3, descaling is executed by rotating the rotary tool (5) in the direction (B) as illustrated so that the upper surface of the rear end of the preceding plate and the lower surface of the front end of the succeeding plate may be cut. If the length (L) of the cutting tool, as illustrated in FIG. 4(a), is longer than the width of the steel plate to be joined, simple rotations will descale the whole area after inserting it as illustrated in FIG.3.

If the tool in use has (L) shorter than the width of the plate, lateral movement of the tool in the direction of the width of the plate will be required in addition to rotation.

Movement of the rotary cutter in the direction as indicated by the arrows (A) will allow extension of the area of descaling in the lateral direction of the plate.

Figure 5:
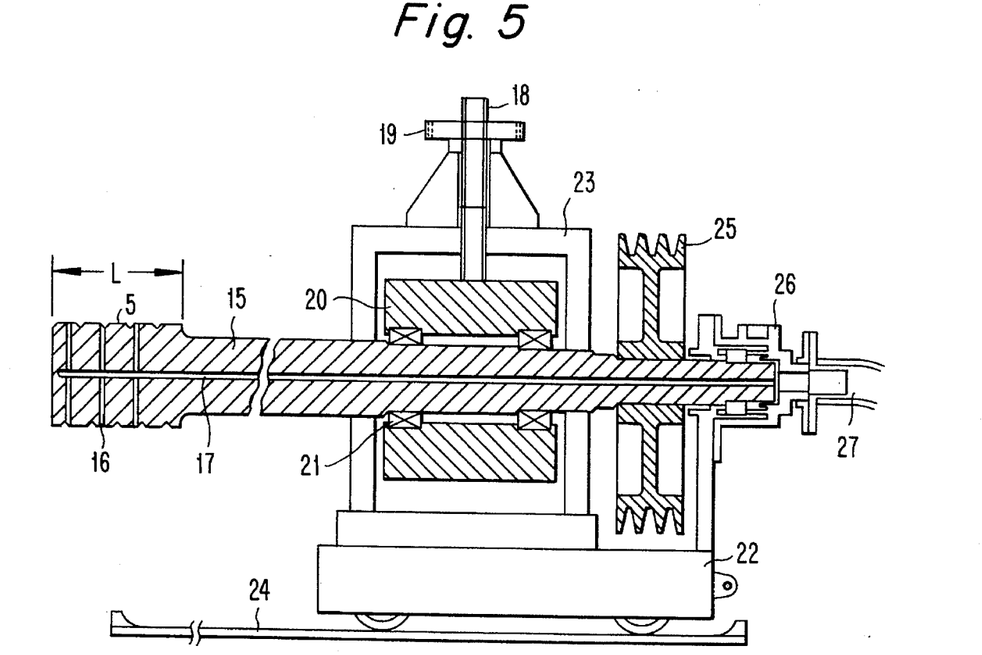
FIG. 5 is a schematic illustration of an internally cooled cutting tool.

A mechanism as illustrated in FIG. 5, can be used for dislocation, positioning, and driving of the rotary cutter for such a purpose.

FIG. 5 illustrates a cross sectional view of an internally cooled rotary cutting tool as described in this invention to be used for descaling. The rotary cutter (5) is placed at the end of the rotary shaft (15) and there are gas ejection holes (16) at appropriate distances in the tool portion.

These ejection holes are connected to the gas supply path (17) along the axis of rotation (15). The axis of rotation (15) is held to rotate freely via the shaft bearing (21) by a chock (20) which rises and falls by a combined mechanism of the spline shaft (18) and the gear (19).

These mechanisms are supported by a frame (23) mounted on a carriage (22) which travels on the rails (24), so that it may be transfered to the position illustrated by FIG. 3 for the joining operation. The other end of the rotary shaft (15) is connected to the gas supply pipe (27) via a rotary joint (26), and rotational driving power is delivered via the pulley (25) from a drive mechanism (e.g. an electric motor) which is not illustrated in the figure.

When the apparatus in FIG.5 is to be used, the carriage (22) is transfered to the location where the plate to be descaled is placed and levelled. The vertical location of the rotary shaft (15) is adjusted by shifting the chocks (20) and by rotating the spline shaft (18) by turning the gear (19). The carriage is then moved to insert the rotary cutting tool between the steel plates (1) and (2) as shown in FIG.3 and then turned to descale the plate surfaces.

In the apparatus shown in FIG. 5 gas supplied from inside the rotary shaft can be blown to the cutting edges before, after or at anytime during the descaling operation.

This gas has the effect of cooling the cutting edges and blowing the scale off, as well as preventing re-oxidization of the steel surface after descaling. The same kind of gas as the protective gas described earlier is used, including inert and reducing gases.

An internally cooled rotary cutting tool uses a cooling method where cooling water is internally circulated throughout a water channel in the tool. A thermal shield as shown in FIG. 3 or FIG. 4 is not necessarily required when rotary cutting tools of gas cooling or water cooling type are applied.

There are a variety of correct times to use the reducing flame atmosphere described in this invention. For example:

1 Blow the reducing flame first, and use a part of the blowing period for descaling, or 2 Begin blowing the reducing flame and descaling at the same time.

Blowing of the reducing flame should be continued until pressure joining begins or finishes, in order to prevent re-oxidization of the joining surfaces after descaling.

Pressure joining should be done in as short a time as possible after descaling is finished. Pressure joining is done for example, by pressing with anvils (8) and (9) in FIG. 3, after setting the rotary cutting tool (5) and the thermal shield (6) aside.

Figure 6:
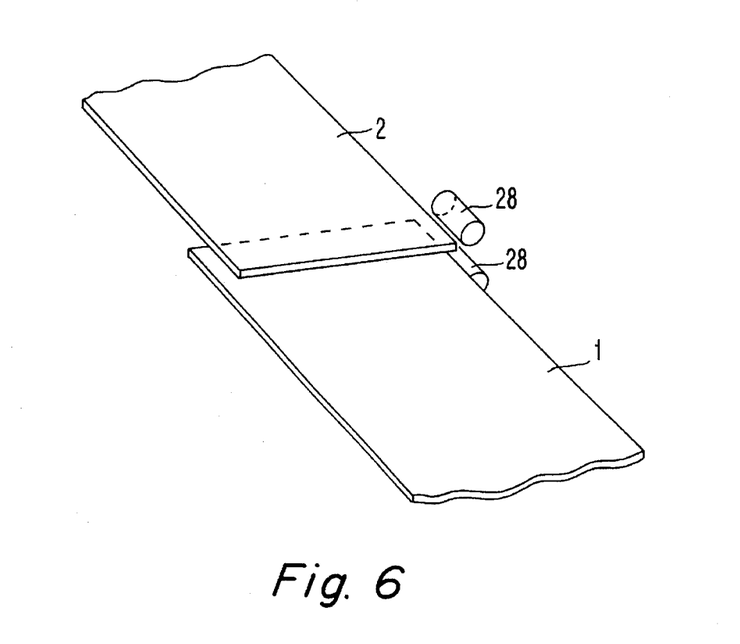
FIG. 6 is a schematic illustration showing how to apply pressure rolls.

Pressure joining can be carried out by methods other than by pressing the whole width of the plate with anvils as shown in FIG. 3. For example, by putting the required pressure from one edge of the plate through the other edge with a pair of pressing rolls (28) placed on the upper and lower sides of the line as shown in FIG. 6, or by pressing the plates with a pair of upper and lower rolls longer than the width of the plates which rotate at a synchronized rate as shown in FIG. 8 and FIG. 9.

Although the temperature of the material to be joined (the joining temperature) is not specifically limited, the usual temperature of the rough rolling stock is set at 900°–1150° C. to maintain a proper temperature in finish rolling. Therefore it is also desirable to have a similar temperature for pressure joining.

The steel stock, for example a sheet bar, to be joined is transferred at an appreciable speed during the joining operation on a hot rolling line. It is feasible to have it stalled for the joining operation, however, this would require a large capacity looper between the joining apparatus and the finish rolling mill. It will also entail a significant temperature decrease of the sheet bar.

Therefore the desirable way of operation of descaling and pressure joining is to carry it out as the sheet bar is being transferred.

Figure 7:
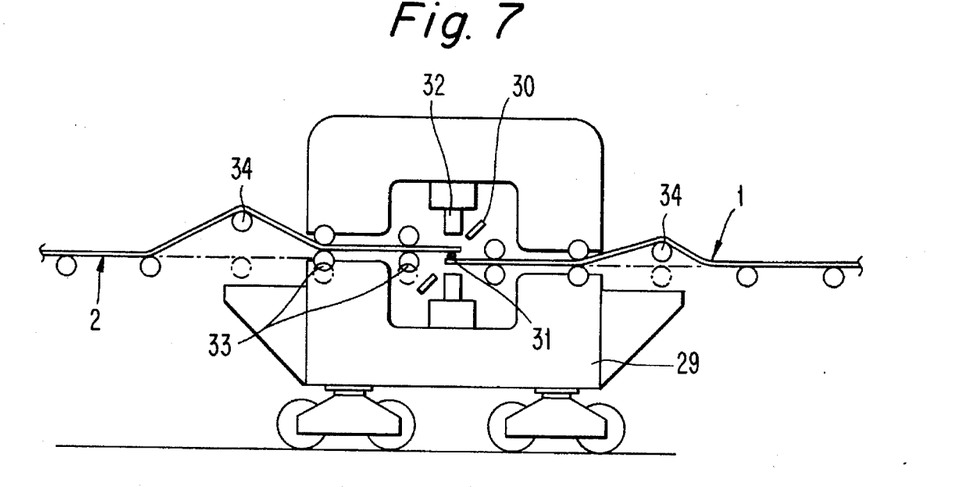
FIG. 7 is a schematic illustration of a carriage to be used for pressure joining of hot steel stock in accordance with this invention.

The following are examples of embodiments of this invention:

(i) FIG. 7 shows a carriage (29) which travels along the rolling line and is equipped with the reducing flame burner (30), the descaling tool (31), the hot press joining tool (32), and the mechanism to lift the steel stock (e.g., pinch rolls) (33). The carriage is transferred while descaling and joining are performed as the steel plate is carried along.

The locations for descaling and joining may be shifted so that the joining faces of the preceding steel plate (1) and the succeeding plate (2) may be descaled in the same plane and joining may be performed by overlapping the plates when they arrive at the location of the joining tools. It is desirable to have a lifting roll type looper (34) installed at the entrance and/or the exit in order to have an adjustable overlapping width.

Figure 8A:
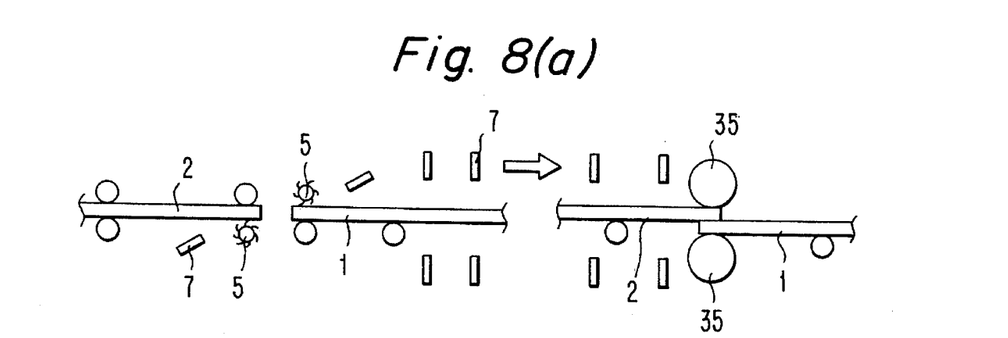
FIG. 8 is a schematic illustration showing how to descale and apply pressure with pressure rolls.
Figure 8B:
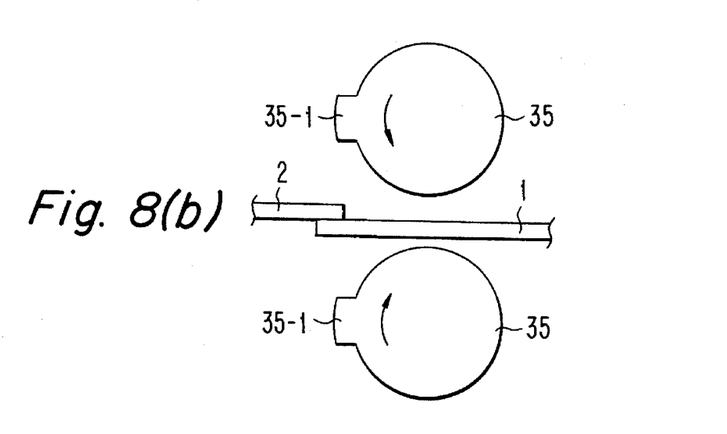
Figure 9:
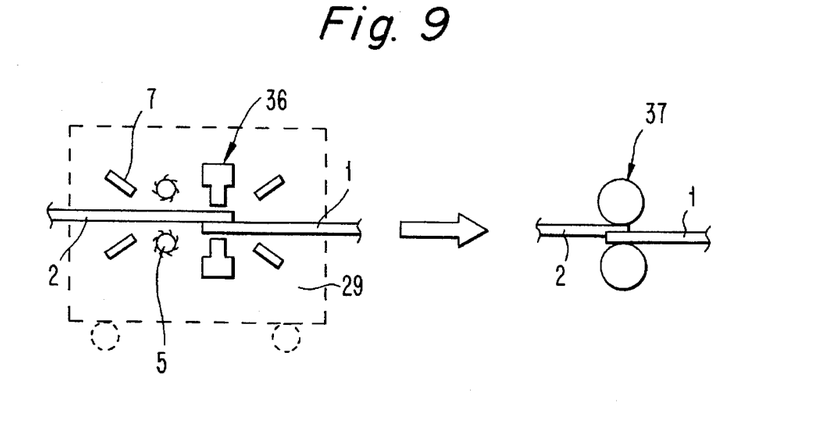
FIG. 9 is a schematic illustration showing how to carry out the preliminary pressure joining and the main pressure joining separately.

(ii) FIG. 8(a) shows that the joining surfaces of the preceding steel stock (1) and the succeeding steel stock (2) are; descaled, transferred as the reducing flame is blown, overlapped at the location of the pressure joining rolls (35) rotating at a rate synchronized with the traveling speed, and then pressed by the rolls. The rolls (35) may be formed to have a protrusion (35–1) as shown in FIG. 8(b) which can be used for pressure joining.

(iii) FIG. 9 illustrates that first the preliminary pressure joining is carried out with the preliminary joining apparatus (36) and then the final pressure joining is done with the main pressure joining apparatus (37). The reducing atmosphere should be maintained from the descaling prior to the preliminary pressure joining up to completion of the preliminary pressure joining, so there will be no re-oxidization of the joining surfaces after preliminary pressure joining.

The advantage of this method is that it is feasible to make use of a relatively small apparatus for the preliminary pressure joining loaded on the carriage (29).

Figure 10:
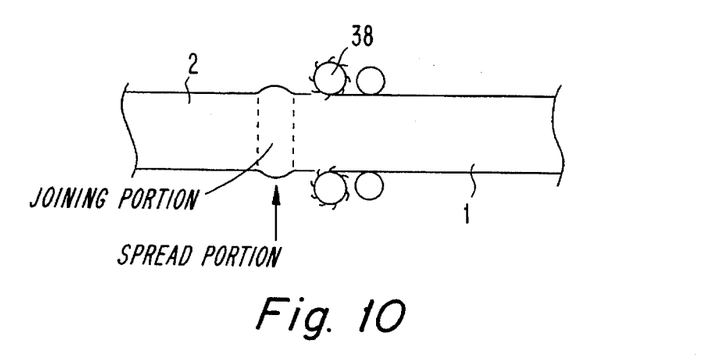
FIG. 10 is a schematic illustration showing how to trim the spread edges.

The usual end of a rough rolled steel plate is in the so-called fish tail shape, which is shortened at the center of the width. If further pressure joined as it is, or after it is cropped, the portion of pressure joining will broaden out in the width direction of the plate. This is called spreading, and is apt to cause accidents such as crashing on the guide in the finish rolling mill. Therefore it is advisable to remove the spread portion by cutting it after pressure joining with the trimmers (38) installed along the both sides of the steel plate as shown in FIG. 10. As well as the rotary blades as shown, straight blades may also be used for the side trimmer.

Figure 11A:
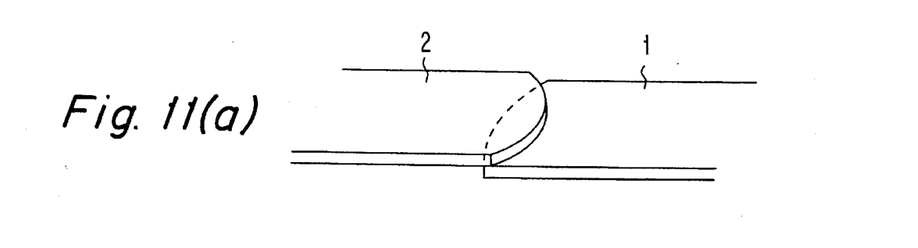
FIG. 11 is a schematic illustration of the preliminary forming of the ends of the steel plates.
Figure 11B:
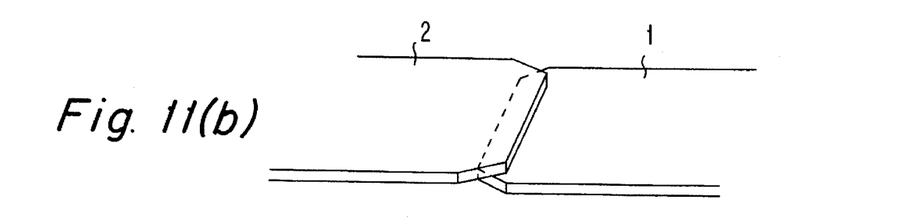

FIG. 11(a) and (b) illustrate examples of devices to avoid difficulties caused due to spreading by fabricating the end (the joining portion) of the plate beforehand. The side trimming will be dispensed with, having no spreading in excess of the plate width as mentioned before, if the center portion of the ends of the plates to be joined are formed to be elongated as illustrated. The preforming of the end of the steel plate can be performed with the width sizing press in the slab stage or with the edger in the rough rolling mill.

EXAMPLES

Hot rolled steel plates, the dimensions of which are 15 mm thick, 300 mm wide, and 500 mm long each (C:0.1%, Si:0.5%, and Mn:1.2%) were prepared for joining tests with overlapped ends. The range of overlapping was up to about 25 mm from the end of the plate. The apparatus used for the experiment was the one as shown in FIG. 3.

Tables 1 and 2 shows the combustion conditions, the ratio of the hot tensile strength, and the degree of damage to tools.

The hot rupture strength means the uniaxial longitudinal tensile strength of the joined test specimen and that of the base metal specimen in the condition of 1000° C. by a high frequency induction heating. The result was compared with the strength of the joined specimen and the base material specimen and represented in terms of percentages, called the hot rupture strength ratio. The rolling operation can be performed without difficulty, if the hot rupture strength ratio is larger than 50%.

The degree of damage to tools is represented by the number of repetitive uses of the rotary cutting tool edge before cracks are generated in it, or of the rotary brushes before hair cracking occurs. The case when the number becomes larger than 30 is represented by ⊙. When it is 20–30, it is represented by ○, and when less than 20, by △.

For the purpose of this test, the steel plates were heated to the predetermined temperature with a high frequency induction heater, without using any shield box, and the joining portions were descaled with either of the following tools and pressure joined primarily under the atmosphere of reducing flame.

(A) Rotary cutting tool:

The material is JIS SK1, with dimensions of 90 mm diameter and 360 mm length (L in FIG. 2). Spiral edges are formed with a 4 mm pitch on it. When a thermal shield (6) (made of SUS 310 grade stainless steel) as shown in FIG. 4 is positioned, the gap between the shield and the tool is filled with nitrogen gas at the pressure of 4 kg/cm$^2$ and the rate of flow at the rate of 60 l/min.

(B) Wire brush:

A cylindrical wire brush of 25 mm diameter and 360 mm length (L in FIG. 4) studded with brushes of wire, each of 0.6 mm diameter and 22.5 mm length made from JIS SUS 304 material, is used with the same thermal shield and covered with the same nitrogen flow as with the rotary cutting tool.

Descaling was carried out over the whole width and up to a length of 25 mm at the end of the steel plate to be tested for hot pressure joining. The time required for descaling was about 5 seconds in the case of both the rotary cutting tool and the wire brush.

Other conditions of the tests were:

(a) test Nos. 1–32

The flame was constituted, using an internal nozzle mixing type burner, by blowing out the mixed gas through the slit nozzle on the ring. 20 Nm$^3$/hour of COG was spent and the oxygen ratio (m) and the oxygen enrichment ratio (P) were varied as shown in Table 1 and 2. The temperature was controlled by high frequency induction heating to bring the joining material temperature as shown in Tables 1 and 2.

Descaling was carried out under the reducing flame with the rotary cutting tool or the wire brush as described above, and pressure joining was also carried out as the reducing flame blowing was continued.

The rate of reduction during the joining operation was set at 45% (That is the piled thickness of plates was pressed down from 30 mm to 16.5 mm). The procedure used for pressure joining was the one with use of a vertical pair of press anvils to cover the whole plate width in one action.

(b) Test Nos. 33–37

Test pieces were press joined after heating was executed in the ambient atmosphere by high frequency induction heating up to the joining temperature as shown in Table 2. Descaling was carried out with the above mentioned rotary cutting tool or the wire brush.

(c) Test Nos. 38 and 39

Test pieces were press joined after heating was executed in the ambient atmosphere by high frequency induction heating up to the joining temperature as shown in Table 2, and after blowing with the reducing flame for about 20 seconds but without descaling. These examples correspond to embodiments of the previous invention disclosed by Japanese Patent Kokai 5-8058 (U.S. Pat. No. 5,222,654).

As is seen in Test Nos. 33–37, re-oxidation on the joining surfaces is unavoidable in the case of descaling and press joining in the atmospheric environment. This results in extremely low ratios of the elevated temperature rupture strength. In the cases of Test Nos. 38 and 39, where reduction of the scale was carried out by the reducing flame only, the joint strength was higher than in Test Nos. 33–37. However, the ratio of the hot rupture strength was still below 50%, because reduction was not sufficiently finished.

On the contrary, for those examples that satisfy all formulas (1)–(3) mentioned above (Those with no mark in the Remarks column), among Test Nos. 1–32 in which descaling and pressure joining were carried out under reducing atmosphere, the ratio of the rupture strength is above 60%, and the damage to tools is minimal. Since formula (1) is not satisfied in Test Nos. 5, 6, 7, 8, 9, and 28, the flame oxidizes and the descaled surfaces re-oxidize. Hence the ratio of the rupture strength is lower.

In cases when formula (2) is not satisfied, e.g., Test Nos. 20, 23, 22, 26, and 32, soot is generated and becomes inclusions on the joined surfaces which weaken the joining strength.

Test Nos. 13, 16, and 19 are examples for which formula (3) was not satisfied. The bonding strength was sufficient, but the tools were badly damaged because the flame temperature was too high. Tools would have to be replaced frequently, which would not be economical.

TABLE 1

| Test Type | No. | Steel Plate Temp. (°C.) | Combustion Conditions m | P (%) | Remarks | Hot Rupture Strength Ratio (%) | Damage to Tools | Generic Evaluation |
|---|---|---|---|---|---|---|---|---|
|  | 1 | 800 | 0.6 | 60 |  | 70 ⊙ | ⊙ | ⊙ |
|  | 2 | 1000 | 0.6 | 60 |  | 85 ⊙ | ⊙ | ⊙ |
|  | 3 | 1200 | 0.6 | 60 |  | 85 ⊙ | ⊙ | ⊙ |
| A* | 4 | 1000 | 0.6 | 60 |  | 80 ⊙ | ○ | ○ |
|  | 5 | 1000 | 0.9 | 30 | Off formula (1) | 25 X | ⊙ | X |
|  | 6 | 1000 | 0.9 | 80 | Off (1) & (3) | 35 X | △ | X |
| A* | 7 | 1000 | 0.9 | 30 | Off formula (1) | 30 X | ○ | X |
|  | 8 | 1000 | 0.8 | 30 | Off formula (1) | 35 X | ⊙ | X |

TABLE 1-continued

| Test Type | Steel Plate No. | Temp. (°C.) | Combustion Conditions P m | (%) | Remarks | Hot Rupture Strength Ratio (%) | Damage to Tools | Generic Evaluation |
|---|---|---|---|---|---|---|---|---|
|  | 9  | 1000 | 0.8 | 50  | Off formula (1) | 40 X  | ○ | X |
|  | 10 | 1000 | 0.7 | 40  |                 | 60 ⊙  | ⊙ | ⊙ |
|  | 11 | 1000 | 0.7 | 50  |                 | 80 ⊙  | ⊙ | ⊙ |
|  | 12 | 1000 | 0.7 | 70  |                 | 80 ⊙  | ○ | ○ |
|  | 13 | 1000 | 0.7 | 80  | Off formula (3) | 75 ⊙  | △ | △ |
|  | 14 | 1000 | 0.6 | 30  |                 | 60 ⊙  | ⊙ | ⊙ |
|  | 15 | 1000 | 0.6 | 80  |                 | 80 ⊙  | ○ | ○ |
|  | 16 | 1000 | 0.6 | 90  | Off formula (3) | 80 ⊙  | △ | △ |
|  | 17 | 1000 | 0.5 | 60  |                 | 85 ⊙  | ⊙ | ⊙ |
|  | 18 | 1000 | 0.5 | 90  |                 | 85 ⊙  | ○ | ○ |
|  | 19 | 1000 | 0.5 | 100 | Off formula (3) | 85 ⊙  | △ | △ |
|  | 20 | 1000 | 0.4 | 30  | Off formula (2) | 55 ○  | ⊙ | ○ |

Note 1:
No indication in the Test Type column means that descaling was performed with the rotary cutting tool A (with shield).
A* means descaling with the rotary cutting tool A without shield.
Note 2:
No indication in the Remarks column means that formulas (1), (2), and (3) are all satisfied.
Note 3:
In the Hot Rupture Strength Ratio column, ⊙ indicates above 60%, ○ above 50% and below 60%, and X below 50%.
Note 4:
Generic Evaluation is based on Hot Rupture Strength Ratio or Damage of Tools, whichever is worse.

TABLE 2

| Test Type | Steel Plate No. | Temp. (°C.) | Combustion Conditions P m | (%) | Remarks | Hot Rupture Strength Ratio (%) | Damage to Tools | Generic Evaluation |
|---|---|---|---|---|---|---|---|---|
|     | 21 | 1000 | 0.4 | 60  |                 | 85 ⊙ | ⊙ | ⊙ |
|     | 22 | 1000 | 0.4 | 100 |                 | 85 ⊙ | ○ | ○ |
| A*  | 23 | 1000 | 0.4 | 30  | Off formula (2) | 52 ○ | ○ | ○ |
|     | 24 | 1000 | 0.3 | 50  | Off formula (2) | 55 ○ | ⊙ | ○ |
|     | 25 | 1000 | 0.3 | 90  |                 | 85 ⊙ | ⊙ | ⊙ |
|     | 26 | 1000 | 0.2 | 50  | Off formula (2) | 55 ○ | ⊙ | ○ |
|     | 27 | 1000 | 0.2 | 100 |                 | 85 ⊙ | ⊙ | ⊙ |
| B   | 28 | 1000 | 0.9 | 50  | Off formula (1) | 30 X | ○ | X |
| B   | 29 | 1000 | 0.8 | 60  |                 | 60 ⊙ | ○ | ○ |
| B   | 30 | 1000 | 0.6 | 40  |                 | 70 ⊙ | ⊙ | ⊙ |
| B   | 31 | 1000 | 0.6 | 60  |                 | 80 ⊙ | ⊙ | ⊙ |
|     | 32 | 1000 | 0.5 | 30  | Off formula (2) | 55 ○ | ⊙ | ○ |
|     | 33 | 800 (Heated in air) | | | (Joining failed) | X | ⊙ | X |
|     | 34 | 1000 (Heated in air) | | | (Joining failed) | X | ⊙ | X |
|     | 35 | 1200 (Heated in air) | | | — | 5 X | ⊙ | X |
| A*  | 36 | 1000 (Heated in air) | | | — | 5 X | ⊙ | X |
| B   | 37 | 1000 (Heated in air) | | | — | 0 X | ⊙ | X |
| **  | 38 | 1000 | 0.5 | 60  |                 | 15 X | — | X |
| **  | 39 | 1200 | 0.5 | 60  | —               | 20 X | — | X |

Note 1:
No indication in the Test Type column means that descaling was performed with the rotary cutting tool A (with shield).
A* means descaling with the rotary cutting tool A without shield.
B means descaling with the wire brush B.
**means blowing with reducing flame only, without mechanical descaling.
Note 2:
No indication in the Remarks column means that formulas (1), (2), and (3) are all satisfied.
Note 3:
In the Hot Rupture Strength Ratio column, ⊙ indicates above 60%, ○ above 50% and below 60%, and X below 50%.
Note 4:
Generic Evaluation is based on Hot Rupture Strength Ratio or Damage of Tools, whichever is worse.

What is claimed is:

1. A method of carrying out hot pressure welding of hot steel stock, comprising mechanically descaling the joining portions of the hot steel stock followed by pressure joining the portions, the descaling and pressure joining steps being carried out in a reducing atmosphere, the reducing atmosphere being obtained by combusting fuel and combustion air under conditions defined by the following formula:

$$P \geq 286\, m - 172 \qquad (1)$$

wherein, P is an oxygen enrichment ratio of oxygen in the combustion air (% by volume) and m is an oxygen ratio of oxygen combusted relative to an amount of oxygen required for complete combustion of the fuel.

2. A method as set forth in claim 1, wherein the steel stock is a steel plate, steel wire, or steel bar.

3. A method as set forth in claim 1, wherein the pressure joining is carried out by lap joining of steel stock.

4. A method as set forth in claim 3, wherein the lap joining is carried out by using either, pressing anvils, a pair of pressing rolls to roll down from one side of the plate to the other, a pair of rolls that rotate at a synchronized speed with the steel stock, or a combination of the above mentioned measures.

5. A method of carrying out hot pressure welding of hot steel stock, characterized by mechanically descaling the joining portions of the hot steel stock prior to pressure joining in a reducing atmosphere, which is obtained by combusting fuel and combustion air under conditions defined by the following formula:

$$P \geq 286\, m - 172 \qquad (1)$$

wherein, P is an oxygen enrichment ratio of oxygen in the combustion air (% by volume) and m is an oxygen ratio of oxygen combusted relative to an amount of oxygen required for complete combustion of the fuel, the mechanical descaling being carried out with a rotary cutting tool.

6. A method as set forth in claim 5, wherein the rotary cutting tool is provided with a thermal shield.

7. A method as set forth in claim 5, wherein the rotary cutting tool is equipped with an internal cooling mechanism.

8. A method as set forth in claim 5, wherein the cutting edge of the rotary cutting tool is covered with non-oxidizing atmosphere.

9. A method as set forth in claim 1, wherein the pressure joining is carried out after the joining portions are heated and/or maintained at the joining temperature.

10. A method as set forth in claim 9, wherein the joining temperature is obtained by using a reducing flame.

11. A method of carrying out hot pressure welding of hot steel stock, comprising mechanically descaling the joining portions of the hot steel stock followed by pressure joining the portions, the descaling and pressure joining steps being carried out in a reducing atmosphere, the reducing atmosphere being obtained by combusting fuel and combustion air under the conditions defined by the formulas (1) and (2), or the formulas (1) and (3), $$P \geq 286\, m - 172 \qquad (1)$$
$$P \geq -113\, m + 90 \qquad (2)$$
$$P \leq -94\, m + 143 \qquad (3)$$

wherein, P is an oxygen enrichment ratio of oxygen in the combustion air (% by volume), and m is an oxygen ratio of oxygen combusted relative to an amount of oxygen required for complete combustion of the fuel.

12. A method as set forth in claim 11, wherein the steel stock is a steel plate, steel wire, or steel bar.

13. A method as set forth in claim 11, wherein the pressure joining is carried out by lap joining of steel stock.

14. A method of carrying out hot pressure welding of hot steel stock, characterized by mechanically descaling the joining portions of the hot steel stock prior to pressure joining in a reducing atmosphere, which is obtained by combusting fuel and combustion air under the conditions defined by the formulas (1) and (2), or the formulas (1) and (3), $$P \geq 286\, m - 172 \qquad (1)$$
$$P \geq -113\, m + 90 \qquad (2)$$
$$P \leq -94\, m + 143 \qquad (3)$$

wherein, P is an oxygen enrichment ratio of oxygen in the combustion air (% by volume), and m is an oxygen ratio of oxygen combusted relative to an amount of oxygen required for complete combustion of the fuel, the mechanical descaling being carried out with a rotary cutting tool.

15. A method as set forth in claim 11, wherein the pressure joining is carried out after the joining portions are heated and/or maintained at the joining temperature.

16. A method of carrying out hot pressure welding of hot steel stock, comprising mechanically descaling the joining portions of the hot steel stock followed by pressure joining the portions, the descaling and pressure joining steps being carried out in a reducing atmosphere, the reducing atmosphere being obtained by combusting fuel and combustion air under the conditions defined by the formulas (1), (2) and (3), $$P \geq 286\, m - 172 \qquad (1)$$
$$P \geq -113\, m + 90 \qquad (2)$$
$$P \leq -94\, m + 143 \qquad (3)$$

wherein, P is an oxygen enrichment ratio of oxygen in the combustion air (% by volume), and m is an oxygen ratio of oxygen combusted relative to an mount of oxygen required for complete combustion of the fuel.

17. A method as set forth in claim 16, wherein the steel stock is a steel plate, steel wire, or steel bar.

18. A method as set forth in claim 16, wherein the pressure joining is carried out by lap joining of steel stock.

19. A method of carrying out hot pressure welding of hot steel stock, characterized by mechanically descaling the joining portions of the hot steel stock prior to pressure joining in a reducing atmosphere, which is obtained by combusting fuel and combustion air under the conditions defined by the formulas (1), (2) and (3), $$P \geq 286\, m - 172 \qquad (1)$$
$$P \geq -113\, m + 90 \qquad (2)$$
$$P \leq -94\, m + 143 \qquad (3)$$

wherein, P is an oxygen enrichment ratio of oxygen in the combustion air (% by volume), and m is an oxygen ratio of oxygen combusted relative to an mount of oxygen required for complete combustion of the fuel, the mechanical descaling being carried out with a rotary cutting tool.

20. A method as set forth in claim 16, wherein the pressure joining is carried out after the joining portions are heated and/or maintained at the joining temperature.

21. A method as set forth in claim 1, wherein the pressure joining is carried out without reducing scale on mating surfaces of the portions to be joined.

22. A method as set forth in claim 11, wherein the pressure joining is carried out without reducing scale on mating surfaces of the portions to be joined.

23. A method as set forth in claim 16, wherein the pressure joining is carried out without reducing scale on mating surfaces of the portions to be joined.

24. A method as set forth in claim 1, wherein the reducing atmosphere heats the portions to a temperature sufficient for joining and prevents re-oxidization of mating surfaces of the portions to be joined.

25. A method as set forth in claim 11, wherein the reducing atmosphere heats the portions to a temperature sufficient for joining and prevents re-oxidization of mating surfaces of the portions to be joined.

26. A method as set forth in claim 16, wherein the reducing atmosphere heats the portions to a temperature sufficient for joining and prevents re-oxidization of mating surfaces of the portions to be joined.

* * * * *